(12) United States Patent
Thangaraj (10) Patent No.: US 12,077,433 B2
(45) Date of Patent: Sep. 3, 2024

(54) ARTICLE FOR GENERATING CHLORINE DIOXIDE

(71) Applicant: Sipka Inc., Edison, NJ (US)

(72) Inventor: John Appadurai Thangaraj, Edison, NJ (US)

(73) Assignee: Sipka Inc., Edison, NJ (US)

( * ) Notice: Subject to any disclaimer, the term of this patent is extended or adjusted under 35 U.S.C. 154(b) by 0 days.

(21) Appl. No.: 18/215,655

(22) Filed: Jun. 28, 2023

(65) Prior Publication Data

US 2023/0339749 A1    Oct. 26, 2023

Related U.S. Application Data

(62) Division of application No. 12/640,889, filed on Dec. 17, 2009, now Pat. No. 11,713,245.

(51) Int. Cl.
*C01B 11/02*    (2006.01)

(52) U.S. Cl.
CPC ................... *C01B 11/024* (2013.01)

(58) Field of Classification Search
CPC ..................................... C01B 11/024
USPC ......................................... 423/477
See application file for complete search history.

(56) References Cited

U.S. PATENT DOCUMENTS

| | | |
|---|---|---|
| 2,043,284 A | 6/1936 | Cunningham et al. |
| 2,309,457 A | 1/1943 | Hutchinson et al. |
| 4,013,761 A | 3/1977 | Ward et al. |
| 4,019,983 A | 4/1977 | Mandt |
| 4,104,190 A | 8/1978 | Hartshorn |
| 4,129,484 A | 12/1978 | Larsson |
| 4,153,512 A | 5/1979 | Messner et al. |
| 4,247,531 A | 1/1981 | Hicks |
| 4,380,458 A | 4/1983 | Callihan |
| 4,547,381 A | 10/1985 | Mason et al. |
| 4,689,169 A | 8/1987 | Mason et al. |
| 4,806,215 A | 2/1989 | Twardowski |
| 4,861,514 A | 8/1989 | Hutchings |
| 5,091,107 A | 2/1992 | Hutchings |
| 5,258,171 A | 11/1993 | Eltomi |

(Continued)

FOREIGN PATENT DOCUMENTS

| | | |
|---|---|---|
| CA | 959238 A | 12/1974 |
| CN | 1486611 A | 4/2004 |

(Continued)

OTHER PUBLICATIONS

Authorized Officer: Alvarez Rodriguez, C, International Search Report issued in PCT Application No. PCT/US2010/023278, Jun. 1, 2010, 15 pp.

(Continued)

*Primary Examiner* — Anita Nassiri-Motlagh
(74) *Attorney, Agent, or Firm* — Kaplan Breyer Schwarz, LLP (57) ABSTRACT

An article for generating chlorine dioxide includes a canister containing a chlorine-dioxide generating composition. The articles in accordance with the invention are able to generate chlorine-dioxide gas, chlorine-dioxide solution, and chlorine-dioxide solution with surfactants. The canister includes at least one porous region that places an exterior of the canister in fluidic communication with an interior of the canister. The porous region, which in some embodiments, is realized as a mesh, is characterized by a size in a range of about 20 mesh to about 325 mesh.

30 Claims, 5 Drawing Sheets

(56) References Cited

U.S. PATENT DOCUMENTS

| | | | |
|---|---|---|---|
| 5,360,609 | A | 11/1994 | Wellinghoff |
| 5,455,972 | A | 10/1995 | Williams |
| 5,478,446 | A | 12/1995 | Falgen et al. |
| 5,583,394 | A | 12/1996 | Burbank et al. |
| 5,707,739 | A | 1/1998 | Wellinghoff et al. |
| 5,935,304 | A | 8/1999 | Shelley et al. |
| 5,958,479 | A | 9/1999 | Roitberg et al. |
| 5,974,810 | A | 11/1999 | Speronello |
| 6,059,860 | A | 5/2000 | Larson |
| 6,077,495 | A | 6/2000 | Speronello et al. |
| 6,238,643 | B1 | 5/2001 | Thangaraj et al. |
| 6,294,108 | B1 | 9/2001 | Speronello et al. |
| 6,432,322 | B1 | 8/2002 | Speronello et al. |
| 6,699,404 | B2 | 3/2004 | Speronello et al. |
| 6,764,661 | B1 | 7/2004 | Girard |
| 6,967,010 | B2 | 11/2005 | Cowley et al. |
| 7,160,484 | B2 | 1/2007 | Thangaraj et al. |
| 7,182,883 | B2 | 2/2007 | Speronello et al. |
| 7,220,367 | B2 | 5/2007 | Speronello et al. |
| 2003/0056648 | A1 | 3/2003 | Fornai et al. |
| 2004/0022676 | A1 | 2/2004 | Hamilton et al. |
| 2005/0224750 | A1 | 10/2005 | Yang et al. |
| 2006/0169949 | A1 | 8/2006 | Speronello et al. |
| 2007/0172412 | A1 | 7/2007 | Hratko et al. |
| 2007/0245928 | A1 | 10/2007 | Bennert et al. |
| 2008/0067470 | A1 | 3/2008 | Thangaraj et al. |
| 2008/0156673 | A1 | 7/2008 | Levine |
| 2009/0142235 | A1 | 6/2009 | Rico et al. |

FOREIGN PATENT DOCUMENTS

| | | | |
|---|---|---|---|
| CN | 1788567 | A | 6/2006 |
| EP | 0423817 | A2 | 4/1991 |
| EP | 0611162 | A1 | 8/1994 |
| JP | 2000-211901 | A | 8/2000 |
| WO | 2003/093170 | A1 | 11/2003 |
| WO | 2006/055361 | A2 | 5/2006 |

OTHER PUBLICATIONS

Authorized Officer: Alvarez Rodriguez, C, Written Opinion issued in PCT Application No. PCT/US2010/023278, Feb. 3, 2013, 5 pp.
Controller: Dr. Jitendra Kumar Pradhan, Examination Report issued in Indian Patent Application No. 1980/KOLNP/2012, Nov. 15, 2017, 9 pp.
Examination Report issued in Brazilian Patent Application No. BR112012019536-0, Dec. 10, 2018, 4 pp. w/ translation.
Examination Report issued in Australian Patent Application No. 2010345048, Nov. 26, 2013, 3 pp.
Notice of Grant issued in Eurasian Patent Application No. 201290754, Dec. 22, 2014, 2 pp. w/translation.
Official Action issued in Eurasian Patent Application No. 201290754, May 5, 2014, 3 pp. w/ translation.
Official Action issued in Eurasian Patent Application No. 201290754, Oct. 23, 2013, 3 pp. w/ translation.
Examination Report issued in Australian Patent Application No. 2010345048, Jun. 5, 2013, 3 pp.
Office Action issued in Mexican Patent Application No. MX/a/2012/009026, Dec. 7, 2015, 3 pp. w/ translation.
Office Action issued in Mexican Patent Application No. MX/a/2012/009026, Feb. 22, 2015, 6 pp. w/ translation.
Office Action issued in Mexican Patent Application No. MX/a/2012/009026, Jun. 18, 2015, 4 pp. w/ translation.
Office Action issued in Canadian Patent Application No. 2,788,642, Jan. 27, 2017, 3 pp.
Office Action issued in Canadian Patent Application No. 2,788,642, Sep. 22, 2015, 5 pp.
Office Action issued in Canadian Patent Application No. 2,788,642, Apr. 28, 2016, 4 pp.
Office Action issued in Canadian Patent Application No. 2,788,642, Oct. 2, 2017, 4 pp.
Final Rejection Mailed on Aug. 30, 2012 for U.S. Appl. No. 12/640,889, 11 page(s).
Final Rejection Mailed on Jul. 23, 2020 for U.S. Appl. No. 12/640,889, 16 page(s).
Final Rejection Mailed on Jun. 18, 2014 for U.S. Appl. No. 12/640,889, 17 page(s).
Final Rejection Mailed on Nov. 1, 2016 for U.S. Appl. No. 12/640,889, 13 page(s).
Final Rejection Mailed on Oct. 4, 2018 for U.S. Appl. No. 12/640,889, 12 page(s).
Final Rejection Mailed on Oct. 18, 2017 for U.S. Appl. No. 12/640,889, 11 page(s).
Final Rejection Mailed on Oct. 22, 2015 for U.S. Appl. No. 12/640,889, 13 page(s).
Final Rejection Mailed on Sep. 17, 2019 for U.S. Appl. No. 12/640,889, 17 page(s).
Formalities Officer: Galatioto, Maruska, Intention to Grant issued in European Patent Application No. 10704277.2, Mar. 27, 2019, 5 pp.
Non-Final Rejection Mailed on Apr. 5, 2016 for U.S. Appl. No. 12/640,889, 14 page(s).
Non-Final Rejection Mailed on Dec. 11, 2019 for U.S. Appl. No. 12/640,889, 19 page(s).
Non-Final Rejection Mailed on Feb. 6, 2012 for U.S. Appl. No. 12/640,889, 7 page(s).
Non-Final Rejection Mailed on Mar. 4, 2019 for U.S. Appl. No. 12/640,889, 13 page(s).
Non-Final Rejection Mailed on Mar. 20, 2017 for U.S. Appl. No. 12/640,889, 15 page(s).
Non-Final Rejection Mailed on Mar. 20, 2018 for U.S. Appl. No. 12/640,889, 13 page(s).
Non-Final Rejection Mailed on Mar. 31, 2015 for U.S. Appl. No. 12/640,889, 12 page(s).
Non-Final Rejection Mailed on Oct. 23, 2013 for U.S. Appl. No. 12/640,889, 14 page(s).
Notice of Acceptance issued in Australian Patent Application No. 2010345048, Dec. 12, 2013, 2 pp.
Notice of Allowance and Fees Due (PTOL-85) Mailed on Mar. 14, 2023 for U.S. Appl. No. 12/640,889, 10 page(s).
Notice of Grant issued in Chinese Patent Application No. 2010800655595.9, Dec. 4, 2014, 6 pp. w/ translation.
Office Action issued in Chinese Patent Application No. 2010800655595.9, Apr. 3, 2014, 8 pp. w/ translation.
Communication issued in European Patent Application No. 10704277.2, Feb. 14, 2017, 4 pp.
Communication issued in European Patent Application No. 10704277.2, Feb. 24, 2014, 3 pp.
Communication issued in European Patent Application No. 10704277.2, Jan. 17, 2014, 5 pp.
Communication issued in European Patent Application No. 10704277.2, Jul. 14, 2015, 4 pp.
Requirement for Restriction/Election Mailed on Oct. 11, 2011 for U.S. Appl. No. 12/640,889, 5 page(s).
The Dow Chemical Company, METHOCEL Cellulose Ethers as Suspending Agents for Suspension Polymerization of Vinyl Chloride, Form No. 192-01188-399AMS, Mar. 1, 1999, 12 PP.

ARTICLE FOR GENERATING CHLORINE DIOXIDE

STATEMENT OF RELATED CASES

This case is a division of U.S. Ser. No. 12/640,889, filed Dec. 17, 2009, and which is incorporated herein by reference.

FIELD OF THE INVENTION

The present invention relates generally to chlorine dioxide, and more particularly to articles for generating gases and solutions containing free chlorine dioxide.

BACKGROUND OF THE INVENTION

Chlorine dioxide ($ClO_2$) is a highly reactive yellowish-green gas molecule. Highly soluble in water, $ClO_2$ is used in a variety of applications, such as for pulp-bleaching, as a bactericide, a viricide, an algaecide, a fungicide, a potent antimicrobial agent and a selective oxidizer. Chlorine dioxide is an effective antimicrobial even at very low concentrations and over wide range of pH.

Recently, gaseous $ClO_2$ has successfully been used to decontaminate areas of the Hart Senate Office Building and the Brentwood postal sorting facility in Washington, DC that were contaminated with *B. anthracis*. $ClO_2$ gas effectively reduces *Bacillus* spores on paper, plastic, epoxy-coated stainless steel, and wood surfaces.

Chlorine dioxide is particularly usefully for removing and preventing the formation of a biofilm, which is a layer of microorganisms contained in a matrix (slime layer). Biofilms, which form on surfaces in contact with water, protect pathogens living therein from concentrations of biocides that would otherwise kill or inhibit those organisms if freely suspended in water. For example, biofilms provide a safe haven for organisms like *Listeria, E. coli* and legionella. In the biofilm, these organisms can reproduce to levels where contamination of products passing through that water becomes inevitable. To that end, chlorine dioxide is used to treat and prevent the formation of biofilms in drinking water facilities and cooling towers. In addition to the health-safety issue, removal and prevention of biofilms equates to higher heat exchange efficiency, longer rotating equipment (e.g., pumps, etc.) lifetime, and lower maintenance costs.

Chlorine dioxide is typically produced commercially from aqueous solutions of chlorite-containing salts. See, for example, U.S. Pat. No. 5,009,875 and Ullmann's Encyclopedia of Industrial Chemistry, vol. A 6, p. 496-500. Various agents are used to generate or release chlorine dioxide. See, for example, U.S. Pat. Nos. 2,309,457, 2,043,284 4,019,983, 4,013,761, 4,806,215, 4,129,484 4,247,531, 6,967,010, 5,478,446, 5,258,171, and 6,967,010.

A significant drawback to using chlorine dioxide is that it is explosive in gaseous concentrations of about 10 volume percent [$ClO_2$/air]. As a consequence, chlorine dioxide is typically produced at the point-of-use via expensive generators that are operated by skilled professionals.

Although historically used in large-scale applications, chlorine dioxide has more recently been used for small-scale applications. As a consequence, the thrust of new chlorine dioxide technologies is for safer generation of high quality $ClO_2$ gas in relatively small quantities.

U.S. Pat. No. 6,238,643 discloses methods for producing an aqueous solution of chlorine dioxide by reacting a metal chlorite and an acid-forming component. The reactants are very stable and do not react to produce chlorine dioxide in the absence of water. Before use, the reactants are separated from liquid water by a membrane (i.e., a Tyvek® bag/sachet). The membrane permits controlled passage of liquid water and/or water vapor. Chlorine dioxide is generated when water passes through the membrane. The chlorine dioxide that is generated passes out through the membrane into liquid water to produce the desired aqueous chlorine dioxide solution.

A major disadvantage of this approach is that when the sachet/bag is placed in water, it generates $ClO_2$ at a rate that is greater than the rate at which $ClO_2$ permeates out of the sachet. As a consequence, the sachet expands/inflates, and a high concentration of $ClO_2$ gas can result inside the sachet, creating an explosion hazard.

U.S. Pat. Nos. 6,432,322, 6,699,404 and 7,182,883 disclose tablets for generating highly-converted solutions of chlorine dioxide rapidly and safely. These tablets comprise of sodium chlorite, dry solid-acid sources, desiccating and filling agents such as calcium chloride and magnesium chloride, and a dichlorocyanuric acid of sodium salt (Na-DCC). NaDCC is added to enhance the yield of chlorine dioxide.

Tablets generally produce chlorine dioxide at a greater rate than membrane devices because the tablet does not have a membrane to restrict chlorine dioxide from escaping into solution. But the quality of the resulting $ClO_2$ is questionable because unconverted reagents are present along with the $ClO_2$. Furthermore, for many applications, the presence of NaDCC with the generated $ClO_2$ is undesirable. But without the NaDCC, less chlorine dioxide is generated.

U.S. Pat. No. 5,091,107 discloses methods and devices for the production of controlled quantities of chlorine dioxide at concentrations that are effective for use as a deodorant or germicide. Aqueous chlorite compositions such as aqueous sodium chlorite are brought into contact, at a controlled rate via capillary means (e.g., a wick), with an absorbent pad containing acid or other reactant that will react with the chlorite to form chlorine dioxide.

U.S. Pat. No. 6,764,661 discloses a device for producing an aqueous chlorine dioxide solution when placed in water. The device includes a membrane shell that defines a compartment. The compartment includes one or more dry chemicals (e.g., a metal chlorite and an acid) that are capable of producing chlorine dioxide gas when exposed to water. A wick extends into the compartment for absorbing water and transporting water into the compartment so that the chemical(s) in the compartment dissolve in the water and produce chlorine dioxide. In some embodiments, the device comprises a Tyvek® pouch that is filled with $ClO_2$ release materials and having a wick. But as previously noted, the Tyvek pouch has limitations related to safety wherein a high concentration of gas can build in the pouch, inflating it, and creating an explosion hazard.

U.S. Publ. Pat. Application 2009/0142235 discloses a disinfectant-generating device that includes a membrane shell. The membrane shell defines at least two compartments, each of which includes at least one dry reactant capable of reacting and producing a disinfectant upon exposure of the device to water or ambient moisture. Each compartment is provided with an outer membrane defining walls of the device, an inner membrane providing physical separation of the dry reactants, and a wick.

U.S. Pat. Nos. 5,974,810, 6,077,495, 6,294,108, 7,220, 367 disclose methods, compositions and systems for generating chlorine dioxide gas in a controlled-release manner. According to the patents, the gas is generated by combining at least one metal chlorite and a dry solid hydrophilic material that reacts with the metal chlorite in the presence of water vapor, but not in the absence of water (liquid or vapor), to produce chlorine dioxide gas in a sustained amount of about 0.001 to 1,000 ppm.

In general, the prior-art devices and methods discussed above use membranes that render them susceptible to premature activation by water or water vapor. This results in a reduced shelf life unless sufficient steps, such as providing an air-tight foil seal, are taken to prevent exposure to ambient moisture or water. But even when such a seal is used, after a few months of storage, the foils tend to crack and lose their seal.

A need therefore remains for a need for simple, convenient and safe device with a long shelf life for generating $ClO_2$ gas or solutions at high yield and with high quality.

SUMMARY OF THE INVENTION

The present invention provides an article for generating chlorine dioxide that avoids some of the drawbacks and costs of the prior art. In accordance with the illustrative embodiment of the present invention, a canister having porous regions contains pre-mixed dry powders of chlorine-dioxide-generating ("CDG") compositions. In some embodiments, the CDG compositions comprise an alkali chlorite salt, acid, cellulose, polyacrylate, and optionally a surfactant.

The porous regions of the canister permit entry of solvent, such as, without limitation, water vapor/liquid water, water vapor, wet air, alcohol, and the like. The solvent primarily functions to bring the active ingredients-base (e.g., —NaClO$_2$) and acid—together. The solvent essentially controls the rate of chlorine dioxide generation. Water (liquid or vapor) is the preferred solvent. And solvents that donate a proton are generally preferable to organic solvents. The solvent should not react with the alkali chlorite salt, acid reactants, nor chlorine dioxide product.

The porous regions of the canister also permit the resulting $ClO_2$ gas or solution to exit the canister. The porosity of the canister is sufficient to prevent a build-up of $ClO_2$ within the canister. In other words, chlorine dioxide is able to exit the canister at a rate that is at least as great as the rate at which it is generated within the canister. Furthermore, the small "openings" in the canister that define the porous region are small enough to retain the granulated/powered components of the CDG composition.

In some embodiments, the canisters include a body and removable (e.g., screw on, press on, etc.) top and/or bottom lids. In some embodiments, the canister is rigid/non-expandable. In some further embodiments, the canister is flexible/expandable. The use of removable lids facilitates re-use of the canister, allowing the canister to be refilled with CDG compositions after each charge thereof is spent. In some embodiments, a portion of one or both of the lids is porous. In some other embodiments, the body of the canister incorporates one or more porous region(s). In some further embodiments, substantially all of the surface of the canister is porous. In accordance with the illustrative embodiment, the porous region(s) comprise a mesh.

The canisters disclosed herein effectively function as a reactor that is capable of generating chlorine dioxide gas or solution. When the canister is immersed in an appropriate solvent, a chlorine dioxide solution results. When the canister is not fully immersed in liquid, chlorine dioxide gas is released into the surrounding space.

Using a canister and CDG compositions in accordance with the illustrative embodiment, a $ClO_2$ solution having a neutral pH (i.e., 6.4-7.0) is generated with concentrations of chlorine dioxide in the range of about 0.01 to 100,000 ppm. Based on canister design (e.g., mesh size, internals, etc.), CDG composition, use of a dessicant, among any other parameters, the rate of $ClO_2$ gas generation or its timing can be controlled. For example, the $ClO_2$ gas can be generated for (i) immediate, (ii) delayed, or (iii) controlled release when exposed to water vapor/water/solvent, etc., at ambient conditions.

Due to mesh-like regions of the canister, which prevent a build-up of $ClO_2$, the explosion danger presented by Tyvek® sachets is eliminated. Canisters containing CDG compositions as described herein provide a shelf life as long as several years, which is far longer than is achieved in the prior art.

DETAILED DESCRIPTION

The devices disclosed herein generate chlorine dioxide by exposing chlorine-dioxide-generating ("CDG") compositions to a solvent, such as water vapor, wet air, liquid water, or solvents of any pH, such as alcohols (e.g., ethanol, isopropyl alcohol, etc.), as described by the following reaction:

$$NaClO_2 + H^+ \rightarrow ClO_2 \qquad [1]$$

In some embodiments, the CDG composition comprises a dry powder including (a) active ingredients, (b) required inert ingredients, and (c) optional inert ingredients.

The active ingredients, which include alkali chlorite salt and acid, are present in an amount within the range of about 3 to about 98 weight percent of the CDG composition.

Required inert ingredients include highly hydrophilic compounds, such as polyacrylate or polyacrylamide, and/or certain cellulose compounds, and/or even desiccant. In the absence of these hydrophilic compounds, the CDG composition is not stable; that is, $ClO_2$ is generated immediately.

These required inert ingredients are present in the CDG composition in an amount in the range of about 2 to 97% weight percent.

Optional inert ingredients, which include hydrophobic compounds, diluents, surfactants, etc., are optionally present in the CDG composition in an amount up to about 93 weight percent (no lower limit).

In some preferred embodiments, the CDG composition comprises:
  alkali chlorite salt: about 20 to about 35 weight percent of the CDG composition;
  acid: about 25 to about 40 weight percent of the CDG composition;
  cellulose/polyacrylate/desiccant: about 55 to about 25 weight percent of the CDG composition.

In some other preferred embodiments, the CDG composition comprises:
  alkali chlorite salt: about 20 to about 35 weight percent of the CDG composition;
  acid: about 25 to about 40 weight percent of the CDG composition;
  cellulose/polyacrylate/desiccant: about 54 to about 20 weight percent of the CDG composition;
  surfactant: about 1 to about 5 weight percent of the CDG composition.

In some additional preferred embodiments, the CDG composition comprises:
  alkali chlorite salt: about 20 to about 35 weight percent of the CDG composition;
  acid: about 25 to about 40 weight percent of the CDG composition;
  cellulose/polyacrylate/desiccant: about 15 to about 25 weight percent of the CDG composition;
  diluents: about 10 to about 40 weight percent of the CDG composition.

In yet some other preferred CDG compositions include:
  alkali chlorite salt: about 1 to about 80 weight percent of the CDG composition;
  acid: about 2 to about 90 weight percent of the CDG composition;
  cellulose: about 2 to about 50 weight percent of the CDG composition;
  polyacrylate: about 2 to about 50 weight percent of the CDG composition.
  (or forms thereof)

Suitable alkali chlorite salts include, without limitation, sodium chlorite, potassium chlorite, and lithium chlorite.

Suitable solid acids include, without limitation, citric acid, mono and di-sodium citrate, sodium hydrogen sulfate, sodium di-hydrogen and mono-hydrogen phosphates, tetra-sodium etidronate (tetra-sodium (1-hydroxyethylidene) bisphosphates, poly(acrylic acid) partial sodium salt, poly(acrylic acid) partial potassium salt, and acid-impregnated inorganic solids.

Suitable cellulosic agents include, without limitation, hydroxy methyl, ethyl and propyl cellulose and methocel E15 premium (hypromellose 2910), microcrystalline cellulose. Suitable polyacrylate-related compounds include, without limitation, sodium polyacrylate and polyacrylamide. Some cellulosic compounds are hydrophobic and some others are hydrophilic, as is known to those skilled in the art. The polyacrylate-related compounds function as highly effective water absorbers.

In some other embodiments, the chlorine-dioxide release materials further comprises surfactants. The presence of the surfactant results in the formation of a soapy chlorine-dioxide solution. If present, the surfactants are typically present in an amount up to about 70 weight percent of the CDG composition.

Suitable surfactants include those that do not react with chlorine dioxide or interfere with its release. Anionic surfactants are generally suitable for use in the solid compositions disclosed herein because, for the most part, they do not react with chlorine dioxide or interfere with its release. Examples include, without limitation, SLS (sodium dodecyl sulfate), sodium laureth sulfate, alkyl sulfonates such as 1-pentane sulfonic acid sodium salt monohydrate, 1-hexane sulfonic acid sodium salt monohydrate, 1-heptane sulfonic acid sodium salt monohydrate, 1-octane sulfonic acid sodium salt, 1-decane sulfonic acid sodium salt, sodium dodecyl benzene sulfonate, linear alkyl benzene sulfonate, sodium alkyl naphthalene sulfonate. Suitable non-ionic surfactants include alkyl poly (ethylene oxide), and more specifically polyethylene oxide. Cationic and zwitterionic surfactants are also suitable for use in conjunction with the illustrative embodiment of the present invention.

Other embodiments of CDG compositions suitable for use in conjunction with the illustrative embodiment of the present invention are disclosed in U.S. Publ. Pat. Appl. 2008/0067470, which is incorporated by reference herein.

In accordance with the illustrative embodiment, a CDG composition, as described above, is added to a canister such as described herein and depicted in the accompanying Figures. The canisters depicted in the Figures are provided by way of illustration, not limitation. In conjunction with this disclosure, those skilled in the art will be able to design and fabricate canisters having different shapes and sizes, as a function of application specifics. In some embodiments, the canisters are commercially-available desiccant canisters. All canisters suitable for use in conjunction with the illustrative embodiment of the present invention will, however, incorporate one or more porous regions as described further below.

Figure 1:
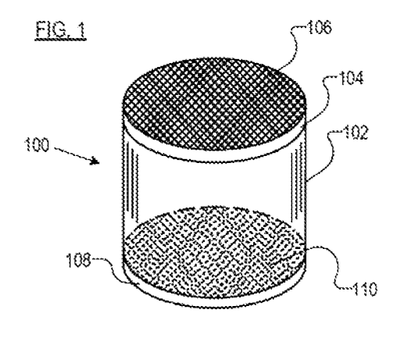
FIG. 1 depicts a first embodiment of a canister for use in conjunction with the illustrative embodiment of the present invention.

FIG. 1 depicts canister 100. This canister comprises cylindrical body 102, and removable lids 104 and 108. In the embodiment of canister 100 depicted in FIG. 1, the major surface of upper lid 104 comprises mesh 106 and the major surface of lower lid 108 comprises mesh 110. In some embodiments, meshes 106 and 110 comprise only a portion of the major surface of each lid. In some additional embodiments, only upper lid 104 comprises a mesh region. In yet some further embodiments, only one of upper lid 104 or lower lid 106 is removable.

Figure 2:
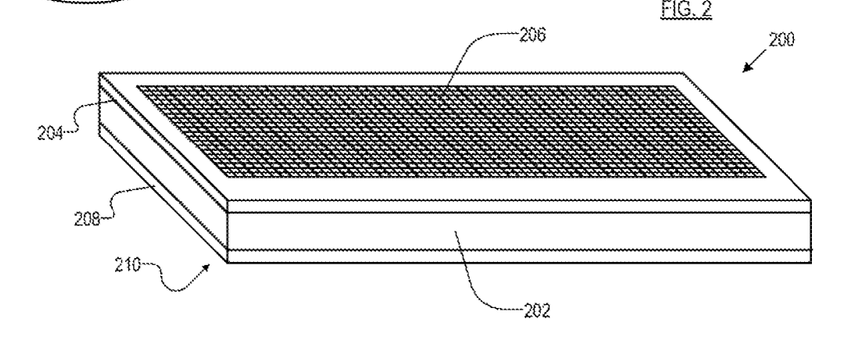
FIG. 2 depicts a second embodiment of a canister for use in conjunction with the illustrative embodiment of the present invention.

FIG. 2 depicts canister 200. This canister has a rectangular form factor and includes body 202 and lids 204 and 208. In the embodiment of canister 200 depicted in FIG. 2, the major surface of upper lid 204 comprises mesh 206 and the major surface (not depicted) of lower lid 208 comprises mesh 210 (not depicted for clarity). In the embodiment of canister 200 depicted in FIG. 2, mesh 206 comprises only a portion of the major surface of upper lid 204. In some embodiments, only upper lid 204 comprises a mesh region. And in yet some further embodiments, only one of upper lid 204 or lower lid 206 is removable.

Figure 3:
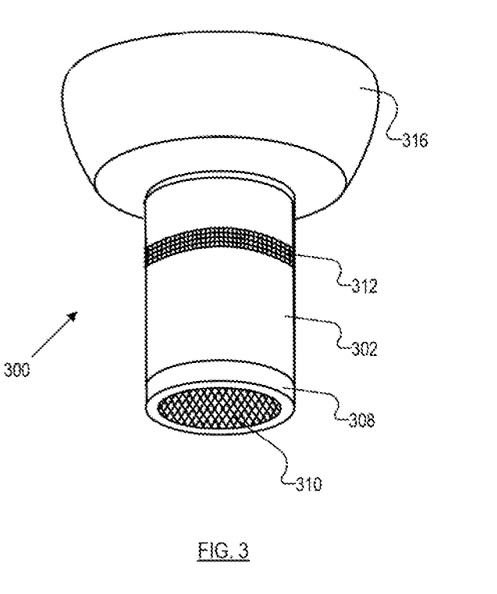
FIG. 3 depicts a third embodiment of a canister for use in conjunction with the illustrative embodiment of the present invention.

FIG. 3 depicts canister 300. This canister includes float cap 316, which adapts it for use in a swimming pool, etc. The canister includes cylindrical body 302, which includes integral mesh 312. Canister 300 further includes bottom lid 308 having mesh 310. In the embodiment depicted in FIG. 3, lid 308 is removable. In some embodiments, float cap 316 is removable. In some embodiments in which float cap 316 is removable, removing the cap provides access to the interior of body 302.

Figure 4:
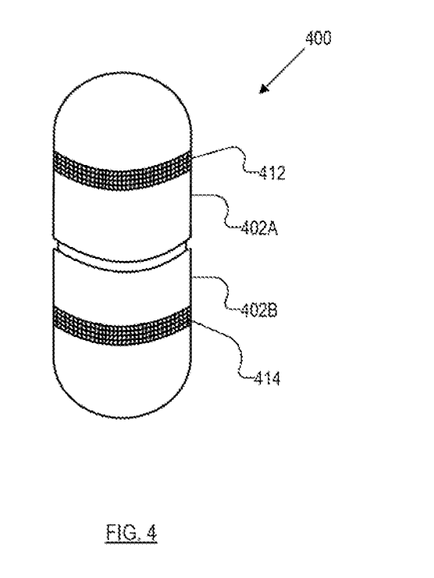
FIG. 4 depicts a fourth embodiment of a canister for use in conjunction with the illustrative embodiment of the present invention.

FIG. 4 depicts canister 400. This canister, which has a "capsule" shape, comprises two complementary mating portions 402A and 402B. In the illustrative embodiment, portion 402A comprises mesh 412 and portion 402B comprises mesh 414. In some alternative embodiments, mesh is present at different regions of portions 402A and 402B. For example, in some embodiments (not depicted), the hemispherical end of each portion 402A and 402B comprise mesh.

In some alternative embodiments, a substantially greater portion of canisters 100, 200, 300, or 400 are mesh. For example, in some embodiments, all of body 102 of canister 100 and body 202 of canister 200 comprise mesh. In some embodiments of canister 300, the full surface of body 302 is mesh. And in some embodiments, the full surface of capsule-shape canister 400 comprises mesh.

Canisters 100 through 400 (hereinafter collectively "the canisters") are formed from materials that are inert with respect to the CDG compositions they are intended to contain. For example and without limitation, the canisters are formed from polymers, metals, ceramics, clay, paper, wood or combinations thereof. Regarding polymers, canisters are preferably, but not necessarily, formed from polyethylene, polypropylene, and plastics (e.g., Formica®, polytetrafluoroethylene, nylon, synthetic rubber, and polyvinyl chloride).

Figure 5:
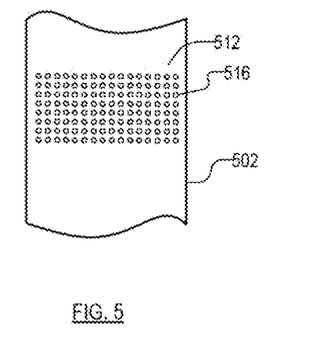
FIG. 5 depicts a first implementation of a mesh for use in conjunction with the illustrative embodiment of the present invention.
Figure 6:
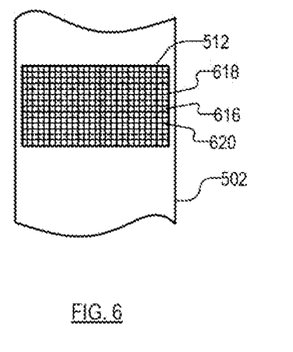
FIG. 6 depicts a second implementation of a mesh for use in conjunction with the illustrative embodiment of the present invention.

In some embodiments, the mesh comprises an array of openings. In the embodiment depicted in FIG. 5 for example, mesh 512 is created by forming an array of openings 516 in body 502 of a canister. In some other embodiments, a portion of the canister is removed and replaced by a mesh insert. Such an embodiment is depicted in FIG. 6, wherein mesh 512 comprises a mesh insert that is formed from a plurality of wires 620 of an appropriate material, which are held in place within frame 618. Openings 616 are formed between crisscrossing wires 620.

The mesh, however implemented, is appropriately sized to (1) retain CDG materials within the canister and (2) permit the movement of water, etc., into the canister and $ClO_2$ to migrate out of the canister with no build up of gases. As used herein, the term "mesh size" references a typical laboratory sieve series, as shown in Table I below, and indicates that the mesh will retain particles that are screened greater (larger) than that particular mesh

TABLE I

Mesh Size vs. Sieve Size

| MESH SIZE | SIEVE SIZE OPENING (MM) |
|---|---|
| 20 | 0.853 |
| 40 | 0.422 |
| 50 | 0.297 |
| 60 | 0.251 |
| 70 | 0.211 |
| 80 | 0.178 |
| 100 | 0.152 |
| 200 | 0.075 |
| 325 | 0.044 |

It has been found that a mesh size within the range of about 20 to 325 is suitable for the aforementioned purposes. More preferably, mesh size is within the range of about 40 to 100.

To prepare a canister for use, the lid, etc., is removed, CDG composition is added and then the lid is re-secured. Typically, the CDG composition is added until the canister is at least about half full, although the canister can function effectively to produce $ClO_2$ whether it is nearly empty or completely full. The main consideration in this regard is the amount of chlorine dioxide to be produced. The most efficient approach is therefore to provide a canister that, when completely filled with CDG composition, provides chlorine dioxide in a desired concentration for a desired amount of time.

Operational Considerations.

Exposing CDG to Solvent. As previously discussed, in accordance with the illustrative embodiment, chlorine dioxide is generated from the dry powder/granular CDG composition in the presence of a solvent, which is preferably liquid water or water vapor. The rate of $ClO_2$ generation can therefore be altered by controlling exposure of the CDG composition access to the solvent. There are several ways to do this, including, for example:
    (1) Altering mesh size;
    (2) Altering the compounds or amounts thereof in the CDG composition;
    (3) Adding a dessicant; and
    (4) Altering the structure of the canister.

(1) Mesh Size. In general, a mesh having relatively larger openings results in an increase in the rate at which chlorine dioxide is produced. And the greater the rate of chlorine-dioxide production, the lower the yield thereof. For example, in some experiments, a change in mesh size from 50 to 20 (see Table I, above) resulted in a 30-percent reduction in $ClO_2$ yield.

(2) CDG Composition. First, there are certain extremely water-adsorbent compounds, such as, without limitation, sodium polyacrylate, sodium polyacrylamide, and certain cellulosic compounds, which adsorb water and form a gel. The presence of the gel limits the ability of the water, etc., to access the active $ClO_2$ generating components (i.e., alkali chlorite salt and acid). It is believed that the gel actually supplies the water, etc., to support the $ClO_2$ reaction. As a consequence, by varying the amount of polyacrylates and/or cellulose in the CDG composition, the rate (and yield) of chlorine dioxide generation can be controlled. Furthermore, altering the amount of polyacrylates and/or cellulose in the CDG composition can delay the onset of chlorine dioxide generation.

Second, reaction rate can be altered (i.e., decreased) by increasing the separation of the active $ClO_2$-generating components (i.e., diluting them) with inert materials such as, without limitation, sodium chloride, sodium sulfate, silica, clay, and the like. Cellulose and poly-acrylates can serve as diluents as well.

(3) Use of Dessicants. For applications involving exposure to water vapor, as opposed to liquid water, a dessicant can be incorporated into the CDG composition, or used in conjunction therewith, within the canister. The desiccant will absorb moisture, therefore acting to delay the release of $ClO_2$ gas. Any of a variety of commercially-available desiccants can be used for this purpose, including, without limitation, silica gel, molecular sieves, calcium or magnesium oxides, and chlorides.

Consider, for example, a canister containing CDG composition and desiccant, in accordance with the present teachings. The canister is contained in packaging that contains, for example, shoes. The desiccant can provides the following functionality:

In applications in which humidity will be present, the desiccant protects against the premature release of chlorine dioxide. In particular, in the presence of humidity, the desiccant will absorb water molecules to its capacity, preventing the growth of mold on, for example, the shoes. Once the desiccant is fully saturated, water will be available for $ClO_2$ release. The $ClO_2$ gas will then control mold or other bacterial growth on the shoes (or in any storage space).

In the absence of humidity, the presence of the desiccant will extend the storage life of the canisters (that is, prevent any reaction of the CDG composition).

The desiccant prevents release of $ClO_2$ in case of accidental exposure to water vapor, etc.

(4) Canister Structure. For some applications, the use of internal compartments in the canisters can moderate the rate at which $ClO_2$ gas is generated. This reduces the risk of explosion and increases $ClO_2$ yield. Compartmentalization is particularly useful for this purpose when canister size and the charge of CDG composition increase. For example, although compartmentalization is usually of limited benefit for charges of CDG composition of less than about 50 grams, it can of significant benefit for charges of 500 grams or more.

Furthermore, the charge of CDG composition at which compartmentalization becomes advantageous is a function of the form factor of the canister. For example, the benefits of compartmentalization will be realized for a relatively smaller charge of CDG composition in canisters having a relatively greater height/width ratio. In this regard, consider the form factor of canisters 100, 300, and 400 on the one hand (relatively greater height/width ratio) versus canister 200 on the other hand (relatively smaller height/width ratio). Canisters 100, 300, and 400 are therefore expected to benefit from compartmentalization at smaller charges of CDG composition than canister 200.

Figure 7:
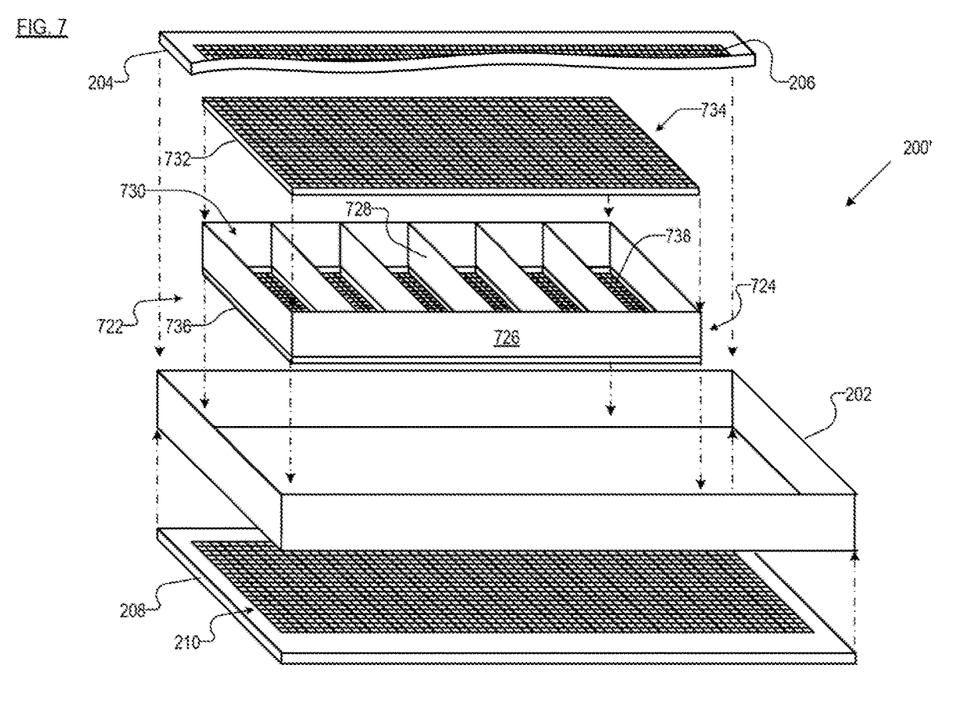
FIG. 7 depicts an alternative embodiment of the canister of FIG. 2, wherein the canister includes a cartridge with discrete compartments.

FIG. 7 depicts canister 200', which is similar to canister 200 of FIG. 2, but further includes multi-compartment cartridge 722. Canister 200' includes body 202, upper lid 204 comprising mesh 206, and lower lid 208 comprising mesh 210. Cartridge 722 comprises body 726, partitions 728, upper lid 732, and lower lid 736, interrelated as depicted. Partitions 728 define a plurality of compartments 730. Upper lid 732 comprises mesh 734 and lower lid 736 comprises mesh 738. In this embodiment, the mesh covers the full extent of the lids. In some embodiments, internal partitions 728 and/or body 726 are porous (i.e., comprises mesh), as well.

In the illustrative embodiment, cartridge 722 is sized to leave a gap between the sidewalls of body 726 of the cartridge and the walls of canister body 202. As a consequence, standoffs, etc., should be used to fix cartridge 722 in place within body 202.

A CDG composition is added to cartridge 722. One or both of upper lid 732 and lower lid 736 are removable for that purpose. As desired, CDG composition can be added to all of the compartments. In some embodiments, CDG composition is added to some of compartments 730 and a desiccant is added to other compartments 730 (e.g., in alternating fashion, etc.) In some other embodiments, desiccant is added to the regioin between the inside walls of canister body 202 and outside of cartridge 722. This creates a "moat" of desiccant around cartridge 722.

In some other embodiments, the CDG composition itself can be partitioned, wherein chlorite, polyacrylate, and cellulose is disposed in some compartments and the solid acid is disposed in other compartments. In such embodiments, partitions 730 must be porous.

In some other embodiments, body 202 includes interior partition walls (not depicted), which serve to compartmentalize body 202 without requiring a discrete cartridge.

Figure 8:
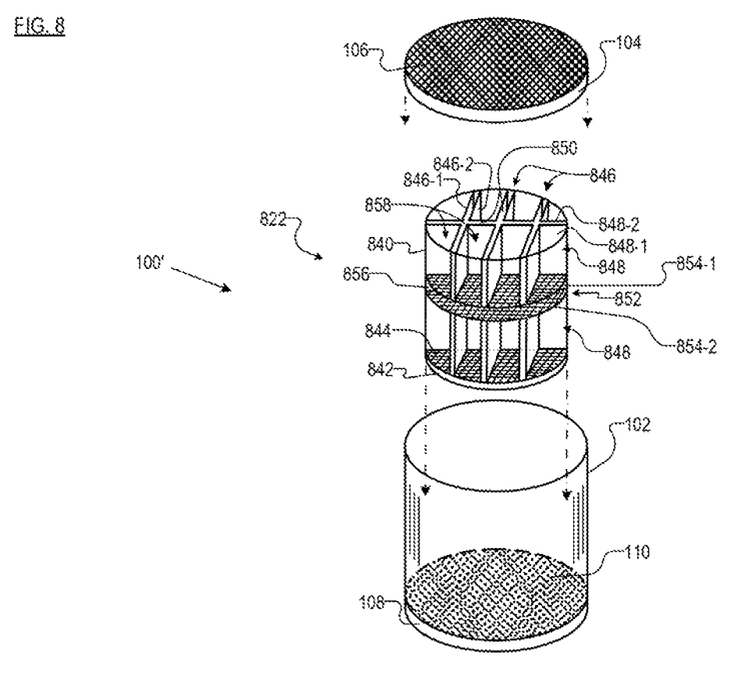
FIG. 8 depicts an alternative embodiment of the canister of FIG. 1, wherein the canister includes a cartridge with discrete compartments.

FIG. 8 depicts canister 100', which is similar to canister 100 of FIG. 1, but further includes multi-compartment cartridge 822. Cartridge 822 differs from cartridge 722 in that it provides internal passage ways for conducting $ClO_2$ gas out of the cartridge.

Canister 100' includes body 102, upper lid 104 comprising mesh 106, and lower lid 108 comprising mesh 110. Cartridge 822 comprises body 840, a plurality of "vertical" partitions 846 and 848, horizontal partition 852, lower lid 842, and an upper lid, which is not depicted for clarity. A plurality of compartments 858 are defined within cartridge 822 by vertical 846, 848 and horizontal 852 partitions, body 840 and the upper or lower lid.

Each vertical partition is defined by two spaced-apart vertical walls. For example, walls 846-1 and 846-2 define one of the vertical partitions 846. Similarly, walls 848-1 and 848-2 define vertical partition 848. The vertical partition 848 bi-sects cylindrical body 840 of cartridge 822. Vertical partitions 846 extend laterally from vertical partition 848. The spaced-apart walls of the vertical partitions define passageways 850. These passageways receive at least a portion of the $ClO_2$ gas that is generated within compartments 858 when solvent reacts with CDG composition. Although not depicted as such for clarity, all vertical partitions are porous (e.g., comprise mesh, etc.) so that $ClO_2$ gas that is generated or solvent that enters the canister is able to flow into or out of passageways 850. In some embodiments, body 840 is porous (e.g., comprises mesh, etc.).

Horizontal partition 852 comprises two spaced-apart horizontal "floors," such as floors 854-1 and 854-2, extending laterally from wall 848-1 of vertical partition 848. Two identical floors (not depicted) extend from wall 848-2 of partition 848, thereby creating another horizontal partition (not depicted) on the obscured side of vertical partition 848. The spaced-apart walls of the horizontal partitions define passageways 856. These passageways receive at least a portion of the $ClO_2$ gas that is generated within compartments 858 when solvent reacts with CDG composition. As depicted, horizontal floors 854-1 and 854-2 are porous (e.g., comprise mesh, etc.) thereby permitting $ClO_2$ or solvent to flow into or out of passageways 856.

The release of $ClO_2$ can be delayed by an amount of time in the range of about 5 minutes to several hours, as function of the CDG composition, mesh size, and the quantity of water vapor/water/solvent. Furthermore, the profile of the release—immediate or sustained—can be varied based on the aforementioned factors. When desiccants are added to the canister, the release of $ClO_2$ gas can be further delayed for up to several months.

When a canister is fully immersed in liquid water/solvent, there is a reduced ability to control the delay and release profile. Adding a hydrophobic compound, such as certain cellulosic compounds (e.g., propylcellulose, etc.), to the CDG composition can delay the release of $ClO_2$ to some extent.

Generating Chlorine Dioxide Gas for Release. The configurations provided by canisters 100 and 200 are particularly well suited for the production of chlorine dioxide gas, such as for introduction into a closed environment, etc. Specifically, either of these canisters is placed in a small amount of liquid solvent (e.g., water, etc.), such that the lower lid (e.g., lower lid 108 of canister 100, etc.) is in contact with liquid water but the upper lid remains above it. As the solvent enters the canister through the mesh of the lower lid and is exposed to the CDG composition within, $ClO_2$ gas is generated. This gas exits the canister through the mesh of the upper lid (e.g., mesh 106 of upper lid 104, etc.).

Generating Chlorine Dioxide Liquid for Release. Any of the canisters 100 through 400 can be dropped into liquid water/solvents for the production of chlorine dioxide solutions.

Contact Time. In order to generate high quality and highly converted $ClO_2$, the reactants (i.e., alkali chlorite salt and solid acid) require a relatively high local concentration and relatively long contact time. In particular, if a gram of chlorite and solid acid is immersed in one liter of water, the composition disperses and little or no chlorine dioxide is generated. The reason for this is the dispersal of the composition results in a low local concentration and low contact time for the chlorite and acid. The canisters disclosed herein promote high local concentration and a sufficiently long contact time, since no dispersal of the reactants occurs.

EXAMPLES

Example 1

A CDG composition (granular form) was prepared and then dried at 90-150° C. Moisture content <1% by weight. The CDG composition included (wt. %):
Sodium Chlorite 35%
Sodium hydrogen sulfate anhydrous 40%
Methyl hydroxy propyl methylcellulose 15%
Sodium Poly-Acrylate 10%
  2 grams of the CDG composition was placed inside canister 100 and then the canister was capped. When the canister was placed in one liter of water, 190 ppm of free $ClO_2$ was rapidly generated in solution, as measured by UV spectrophotometer at 360 nm. The pH of the $ClO_2$ solution was 6.4.
  2 grams of the CDG composition was placed inside canister 100. When the canister was immersed in 1 liter of 10% ethanol solution, 172 ppm of free $ClO_2$ was rapidly generated in solution, as measured by UV spectrophotometer at 360 nm.
  2 grams of the CDG composition was placed inside canister 100. When the canister was immersed in 1 liter of 10% isopropyl solution, 160 ppm of free $ClO_2$ was rapidly generated in solution, as measured by UV spectrophotometer at 360 nm.
  2 grams of the CDG composition was placed inside canister 100. The canister was exposed to 5 ml of water. $ClO_2$ gas was rapidly generated and total yield was about 10 weight percent (based on the CDG composition).
  2 grams of the CDG composition was placed inside canister 100. The canister was exposed to ambient humidity. $ClO_2$ gas was slowly generated with sustained release over 12 days (at 1-10 wppm in the space).

Example 2

A CDG composition including anionic surfactants was prepared and then dried at 90-150° C. The CDG composition included (wt. %):
Sodium Chlorite 35%
Sodium hydrogen sulfate anhydrous 40%
Methyl hydroxy propyl methylcellulose 13%
Sodium Poly Acrylate 10%
Sodium Luryl Sulfate (SLS or SDS) 2%
  2 grams of the CDG composition was placed inside canister 100 and then the canister was capped. When the canister was placed in one liter of water, a soapy solution containing 186 ppm of free $ClO_2$ was rapidly generated, as measured by UV spectrophotometer at 360 nm. The pH of the $ClO_2$ solution was 6.5.

Example 3

A CDG composition (granular form) was prepared and then dried at 90-150° C. The CDG composition included (wt. %):
Sodium Chlorite 35%
Citric Acid 40%
Hyroxy propyl methylcellulose 25% (food grade)
  2 grams of the CDG composition and 1 gram of slica gel beads were placed inside canister 100 and capped. When the canister was placed in one liter of water, 166 ppm of free $ClO_2$ was generated in solution, as measured by UV spectrophotometer at 360 nm.
  2 grams of the CDG composition and 1 gram of slica gel beads were placed inside canister 100 and capped. The canister was exposed to ambient conditions. After a delay of 8 days, chlorine dioxide gas was released continuously over a period of 26 days, ranging from 5 to 10 ppm in the space).

Example 4

A CDG composition (granular form) including desiccant was prepared and then dried at 90-150° C. The CDG composition included (wt. %):
Sodium Chlorite 25%
Sodium hydrogen sulfate anhydrous 30%
Clay or Silica 30% (inert diluent)
Desiccant and mixture of desiccants 15%
  2 grams of the CDG composition were placed inside canister 100 and capped. When the canister was placed in one liter of water, 142 ppm of free $ClO_2$ was generated in solution, as measured by UV spectrophotometer at 360 nm.

The CDG compositions of Examples 1 through 4 were formulated to be stable for at least 2 to 3 days when exposed to ambient conditions. In Example 3, the formulation was stable for eight days ($ClO_2$ release was delayed for eight days). The total amount of polyacrylate/cellulose/desiccant for each Example, as a weight percentage of the CDG composition, is as follows:
Example 1: 25
Example 2: 23
Example 3: 25

It was observed that when polyacrylate or cellulose was increased to 30 weight percent in the CDG composition, $ClO_2$ release was delayed for about 10 to 12 days. The trend is consistent with theory; a relatively longer delay to the onset of chlorine dioxide generation is achieved by increasing the amount of polyacrylate/cellulose/desiccant in the CDG composition. Those skilled in the art will be able to use simple experimentation to determine an appropriate amount of polyacrylate/cellulose/desiccant to achieve a desired delay time for a given canister configuration (e.g., mesh size, internals layout, form factor, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for making a chlorine-dioxide-generating article, the method comprising:
   preparing a chlorine-dioxide-generating composition in a dry powder/granular form, wherein the composition comprises:
      (i) active ingredients, including an alkali chlorite salt and a solid acid, and
      (ii) at least one inert ingredient including a hydrophilic compound;
   providing a canister, wherein the canister includes:
      (i) an internal volume, the internal volume being sufficient to contain an amount of the chlorine-dioxide-generating composition, and
      (ii) a first porous region, wherein the first porous region permits movement of a solvent into the canister, and
   adding the amount of chlorine-dioxide generating composition to the internal volume of the canister.

2. The method of claim 1 comprising exposing the first porous region of the canister to a solvent.

3. The method of claim 2 wherein the solvent is a vapor or gas.

4. The method of claim 2 wherein the solvent is a liquid solvent.

5. The method of claim 2 wherein the first porous region is disposed at a top of the canister.

6. The method of claim 5 wherein exposing the first porous region of the canister to a solvent comprises pouring water through the first porous region and into the canister, the method thereby providing for rapid release of chlorine dioxide.

7. The method of claim 6 wherein chlorine dioxide generated by the chlorine-dioxide-generating solution migrates out of the first porous region at the top of the canister.

8. The method of claim 6 wherein there are no internal partitions in the internal volume, and the amount of the chlorine-dioxide-generating composition is less than 500 grams.

9. The method of claim 4 wherein the canister has a second porous region, and wherein the second porous region is disposed above the first porous region and is not exposed to the liquid solvent.

10. The method of claim 4 comprising submerging the canister in the liquid solvent.

11. The method of claim 10 comprising adding a hydrophobic compound to the chlorine-dioxide generating compound.

12. The method of claim 1 wherein:
   providing the canister comprises partitioning the internal volume of the canister into at least a first region and a second region, wherein the first region contains the amount of the chlorine-dioxide-generating compound, and
   the method comprises adding a desiccant to the second region.

13. The method of claim 1 wherein the hydrophilic compound is a cellulosic material.

14. The method of claim 1 wherein the hydrophilic compound is a polyacrylate.

15. The method of claim 1 wherein the hydrophilic compound is a desiccant.

16. The method of claim 1 comprising altering an onset of chlorine-dioxide generation from a baseline onset.

17. The method of claim 16 wherein altering the onset comprises increasing the amount of hydrophilic compound from a baseline amount thereof, wherein the increase results in a delay of the onset of chlorine-dioxide generation relative to a time of onset corresponding to the baseline amount.

18. The method of claim 2 comprising controlling access of the solvent to the active ingredients of the chlorine-dioxide-generating composition to achieve a desired rate of chlorine-dioxide generation.

19. The method of claim 18 wherein the first porous region is characterized by a plurality of openings characterized by a mesh size, and controlling access of the solvent to the active ingredients comprises selecting a desired mesh size, wherein a mesh size corresponding to a relatively larger opening increases the rate of chlorine dioxide generation compared to a mesh size corresponding to a relatively smaller opening.

20. The method of claim 18 wherein controlling access of the solvent to the active ingredients comprises altering an amount of the hydrophilic compound in the chlorine-dioxide-generating composition from a baseline amount thereof, wherein as the amount of hydrophilic compound increases from the baseline amount, the rate of chlorine-dioxide generation decreases relative to the rate of chlorine-dioxide generation corresponding to the baseline amount.

21. The method of claim 18 wherein controlling access of the solvent to the active ingredients comprises increasing a separation of the active ingredients.

22. The method of claim 21 wherein increasing the separation comprises diluting the active ingredients by increasing, from a baseline amount, an amount of inert materials.

23. The method of claim 21 wherein increasing the separation comprises partitioning the chlorine-dioxide-generating composition by:
   partitioning the internal volume of the canister into at a plurality of compartments; and
   disposing the alkali chlorite salt in some of the compartments and disposing the solid acid in other of the compartments.

24. The method of claim 1 wherein the canister has a body portion that encloses the internal volume, and wherein the internal volume of the canister includes a cartridge comprising plural compartments, and wherein there is a gap between an exterior of the cartridge and an interior wall of the body portion, the method comprising disposing desiccant in the gap.

25. A method for making a chlorine-dioxide-generating article, the method comprising:
   preparing a chlorine-dioxide-generating composition in a dry powder/granular form, wherein the composition comprises:
      (i) active ingredients, including an alkali chlorite salt and a solid acid,
      (ii) at least one inert ingredient including a hydrophilic compound; and
   providing a canister, wherein the canister includes:
      (i) an unpartitioned internal volume, the unpartitioned internal volume being sufficient to contain an amount of the chlorine-dioxide-generating composition, and
      (ii) a region at a top of the canister that enables a flow of a liquid solvent into the canister and that enables chlorine dioxide that is generated by the chlorine-dioxide-generating composition to migrate out of the canister;
   adding the amount of the chlorine-dioxide generating composition to the internal volume of the canister.

26. The method of claim 25 comprising pouring the liquid solvent into the canister through the top of canister.

27. The method of claim 26 wherein the liquid solvent is water.

28. The method of claim 25 wherein the solid acid comprises sodium hydrogen sulfate.

29. The method of claim 28 wherein the solid acid comprises citric acid.

30. The method of claim 25 wherein the solid acid comprises citric acid.

* * * * *